United States Patent
Khan et al.

(10) Patent No.: US 12,278,500 B2
(45) Date of Patent: Apr. 15, 2025

(54) WIRELESS POWER TRANSFER ANTENNA AND SYSTEM

(71) Applicant: Kansas State University Research Foundation, Manhattan, KS (US)

(72) Inventors: Saeed M. Khan, Salina, KS (US); Chad Bailey, Salina, KS (US)

(73) Assignee: KANSAS STATE UNIVERSITY RESEARCH FOUNDATION, Manhattan, KS (US)

( * ) Notice: Subject to any disclaimer, the term of this patent is extended or adjusted under 35 U.S.C. 154(b) by 49 days.

(21) Appl. No.: 18/560,186

(22) PCT Filed: May 12, 2022

(86) PCT No.: PCT/US2022/028955
§ 371 (c)(1),
(2) Date: Nov. 10, 2023

(87) PCT Pub. No.: WO2022/241094
PCT Pub. Date: Nov. 17, 2022

(65) Prior Publication Data
US 2024/0243613 A1      Jul. 18, 2024

Related U.S. Application Data

(60) Provisional application No. 63/187,999, filed on May 13, 2021.

(51) Int. Cl.
*H02J 50/10* (2016.01)
*H01F 38/14* (2006.01)
*H01Q 11/08* (2006.01)

(52) U.S. Cl.
CPC .............. *H02J 50/10* (2016.02); *H01F 38/14* (2013.01); *H01Q 11/08* (2013.01)

(58) Field of Classification Search
CPC . H02J 50/10; H02J 50/23; H02J 50/27; H01F 38/14; H01F 27/289; H01Q 11/08
See application file for complete search history.

(56) References Cited

U.S. PATENT DOCUMENTS

| | | | |
|---|---|---|---|
| 10,050,475 B2 * | 8/2018 | Khan | H04B 5/79 |
| 2008/0094307 A1 * | 4/2008 | Cowles | H01Q 21/26 |
| | | | 343/895 |
| 2010/0214177 A1 * | 8/2010 | Parsche | H01Q 7/00 |
| | | | 343/702 |

(Continued)

OTHER PUBLICATIONS

International Search Report and Written Opinion in corresponding PCT application Serial No. PCT/US2022/028955, dated Sep. 13, 2022.

*Primary Examiner* — Jared Fureman
*Assistant Examiner* — Michael J Warmflash
(74) *Attorney, Agent, or Firm* — Hovey Williams LLP (57) ABSTRACT

An antenna for transmitting power in a wireless power transfer system comprises a first arm and a second arm. The first arm has a proximal end and a distal end extending helically about a first central axis. The second arm has a proximal end and a distal end extending helically about a second central axis toward the distal end of the first arm. A radius between the second arm and the second central axis increases in a distal direction away from the proximal end.

18 Claims, 4 Drawing Sheets

(56) References Cited

U.S. PATENT DOCUMENTS

| | | | | |
|---|---|---|---|---|
| 2011/0037679 A1* | 2/2011 | Shlager | ................. | H01Q 11/08 |
| | | | | 343/895 |
| 2013/0106664 A1* | 5/2013 | Igwe | ..................... | H01Q 11/08 |
| | | | | 29/601 |
| 2014/0266018 A1* | 9/2014 | Carobolante | ........... | H02J 50/60 |
| | | | | 320/108 |
| 2016/0156230 A1* | 6/2016 | Khan | ...................... | H04B 5/79 |
| | | | | 307/104 |

* cited by examiner

WIRELESS POWER TRANSFER ANTENNA AND SYSTEM

CROSS-REFERENCE TO RELATED APPLICATIONS

The present application is the U.S. National Stage of International Patent Application No. PCT/US2022/028955, filed May 12, 2022, entitled WIRELESS POWER TRANSFER ANTENNA AND SYSTEM which claims the priority of U.S. Provisional Patent Application Ser. No. 63/187,999, filed May 13, 2021, and entitled "EFFICIENT WIRELESS POWER TRANSFER (WPT) AND FIELD CONTAINMENT THROUGH CHIRAL ORDERING OF A FOUR-TIER WPT SYSTEM", each of which is hereby incorporated in its entirety by reference herein.

BACKGROUND

Wireless power transfer systems are configured to transmit electrical power without a physical, electrical connection. This is accomplished by emitting electromagnetic waves from a transmitter to a receiver. Certain applications of wireless power transfer systems involve proximity to humans, so measures must be taken to prevent harmful electromagnetic radiation from reaching spaces occupied by humans. Some such measures involve using electromagnetic shielding. However, the electromagnetic field in the space between the transmitter and the receiver can increase laterally as the amount of power transferred increases, which risks human exposure to harmful electromagnetic radiation. Shielding cannot be used between in the space between the transmitter and receiver without reducing the functionality of the devices to which they are attached or without affecting the efficiency of the power transfer. Thus, the electrical power of the transferred signals must be limited to avoid exposure via a lateral portion of the field between the transmitter and the receiver, which creates a limit on the amount of energy that can be transferred within a time period.

The background discussion is intended to provide information related to the present invention which is not necessarily prior art.

SUMMARY OF THE INVENTION

The present invention solves the above-described problems and other problems by providing an antenna and wireless power transfer system that contains the electromagnetic field, as well as a method of wireless power transfer.

An embodiment of the antenna is operable to transmit power in a wireless power transfer system and comprises a first arm and a second arm. The first arm has a proximal end and a distal end extending helically about a first central axis.

The second arm has a proximal end and a distal end extending helically about a second central axis toward the distal end of the first arm. A radius between the second arm and the second central axis increases in a distal direction away from the proximal end. The second arm is operable to act as a parasitic element on electromagnetic waves emitted by the first arm. This modifies the waves to contain the electromagnetic field about the antenna, thereby reducing the risk of unwanted exposure to the electromagnetic waves while wirelessly transferring power.

An embodiment of the antenna structure is for transferring power in a wireless power transfer system. The antenna structure comprises a transmitting antenna and a receiving antenna. The transmitting antenna is for transmitting electromagnetic waves and comprises a first arm and a second arm. The first arm has a proximal end and a distal end extending helically about a first central axis. The second arm has a proximal end and a distal end extending helically about a second central axis toward the distal end of the first arm. A radius between the second arm and the second central axis increases in a distal direction away from the proximal end of the second arm. The receiving antenna is for receiving the electromagnetic waves from the transmitting antenna and comprises a first arm having a proximal end and a distal end extending helically about a third central axis.

An embodiment of the method of wireless power transfer comprises transmitting electromagnetic waves via a transmitting antenna having a first arm with a proximal end and a distal end extending helically about a first central axis; and modifying the electromagnetic waves via a second arm of the transmitting antenna, the second arm having a proximal end and a distal end extending helically about a second central axis toward the distal end of the first arm, wherein a radius between the second arm and the second central axis increases in a distal direction away from the proximal end.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
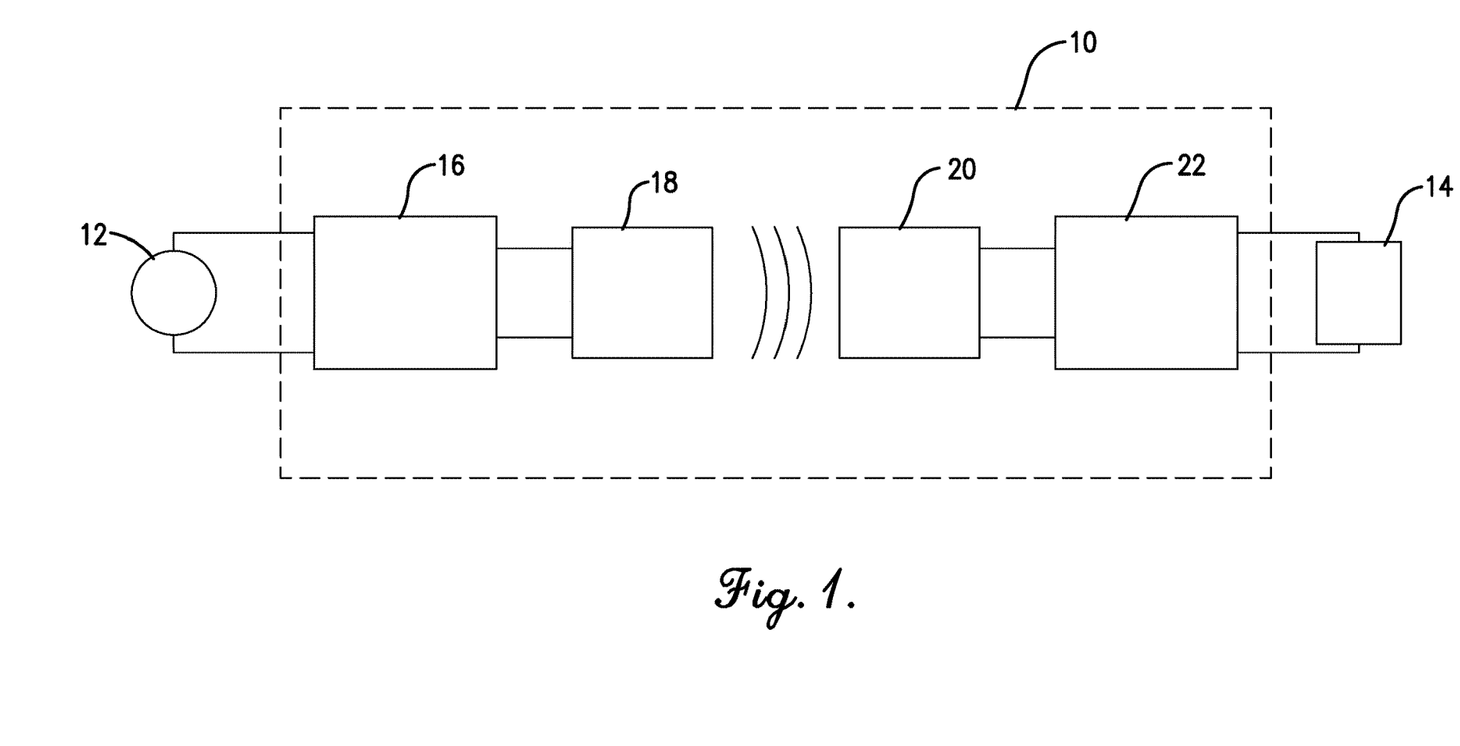
FIG. 1 is a block diagram of a wireless power transfer system in which embodiments of the present invention may be implemented.

Turning to FIG. 1, a wireless power transfer system 10 in which embodiments of the invention can be implemented is schematically illustrated. The illustrated wireless power transfer system 10 may be implemented for any application without departing from the scope of the present invention, including for charging a vehicle, providing power to an electric locomotive, transferring power between systems in space, or the like. The wireless power transfer system 10 may have access to a power source 12, such as a connection to the power grid, a generator, an energy storage device, or the like. The wireless power transfer system 10 is configured to transfer power from the power source 12 to a load or energy storage device 14. The load or energy storage device 14 may include a motor, electronic circuit, battery, capacitor bank, or the like.

The wireless power transfer system 10 may comprise a signal generator 16, a transmitting antenna 18, a receiving antenna 20, and a rectifier or converter circuit 22. The signal generator 16 is operable to produce a signal for producing electromagnetic waves from the transmitting antenna 18. The signal may generally be an alternating current (AC) signal. The frequency of the signal may depend on the application and the size of the antennas 18, 20, as discussed in more detail below, but may generally be any frequency without departing from the scope of the present invention. In some embodiments of the present invention, the frequency is between 10 MHz and 20 MHz. In some embodiments the frequency is between 11 MHz and 14 MHz. In some preferred embodiments, the frequency is between 15 MHz and 17 MHz. The power of the signal, e.g., the voltage and current, may also depend on the application, the current capacity of the antennas 18, 20, etc.

Figure 2:
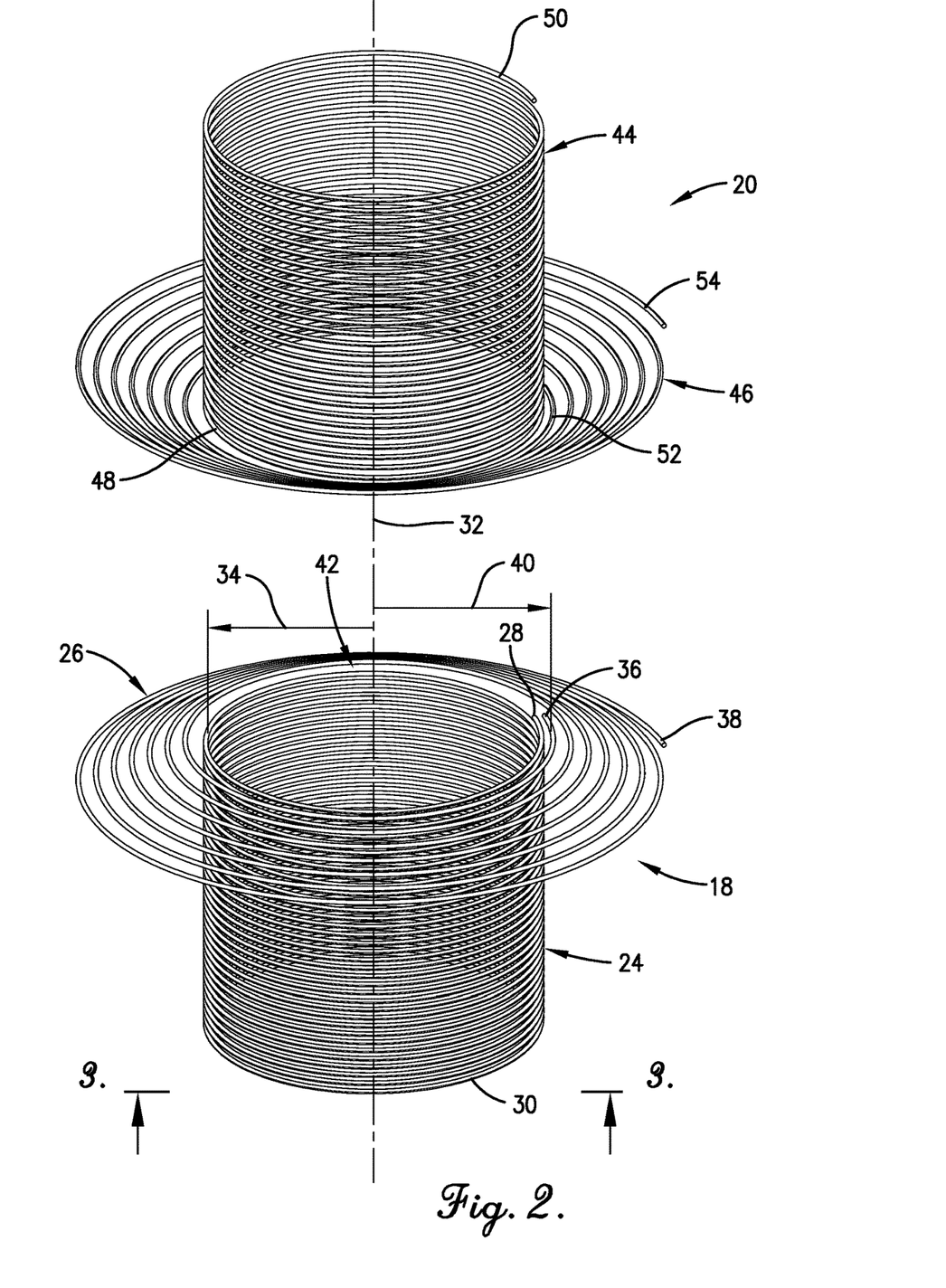
FIG. 2 is a perspective view of antennas constructed in accordance with an embodiment of the present invention.

Turning to FIG. 2, the transmitting antenna 18 and the receiving antenna 20 constructed according to an embodiment of the present invention are depicted. The transmitting antenna 18 emits electromagnetic waves and comprises a first arm 24 and a second arm 26. The first arm 24 may have a proximal end 28 and a distal end 30 extending helically about a central axis 32 to form a multiturn helix having a longitudinal length. In some embodiments, the longitudinal length of the multiturn helix formed by the first arm 24 may be about half a wavelength of the electromagnetic signal emitted therefrom, or half a wavelength of the signal generated by the signal generator 16. The first arm 24 may extend about the central axis 32, or be wound around the central axis 32, at a first radius 34. The first arm 24 may extend about the axis 32 in any direction without departing from scope of the present invention. However, as discussed further below, the direction may depend on a desired configuration of the receiving antenna 20.

The second arm 26 acts as a parasitic element and contains the electromagnetic fields emanating from the first arm 24. The second arm 26 has a proximal end 36 and a distal end 38 extending helically about the axis 32 toward the distal end 30 of the first arm 24. The radius 40 between the second arm 26 and the central axis 32 increases in a distal direction away from the proximal end 36. In some embodiments, the second arm 26 may form a multiturn helix having a conical shape. The proximal end 36 of the second arm 26 at least partially defines an opening 42 through which the first arm 24 may extend. The opening 42 may have a radius that is longer than the radius 34 of the first arm 24.

Figure 3:
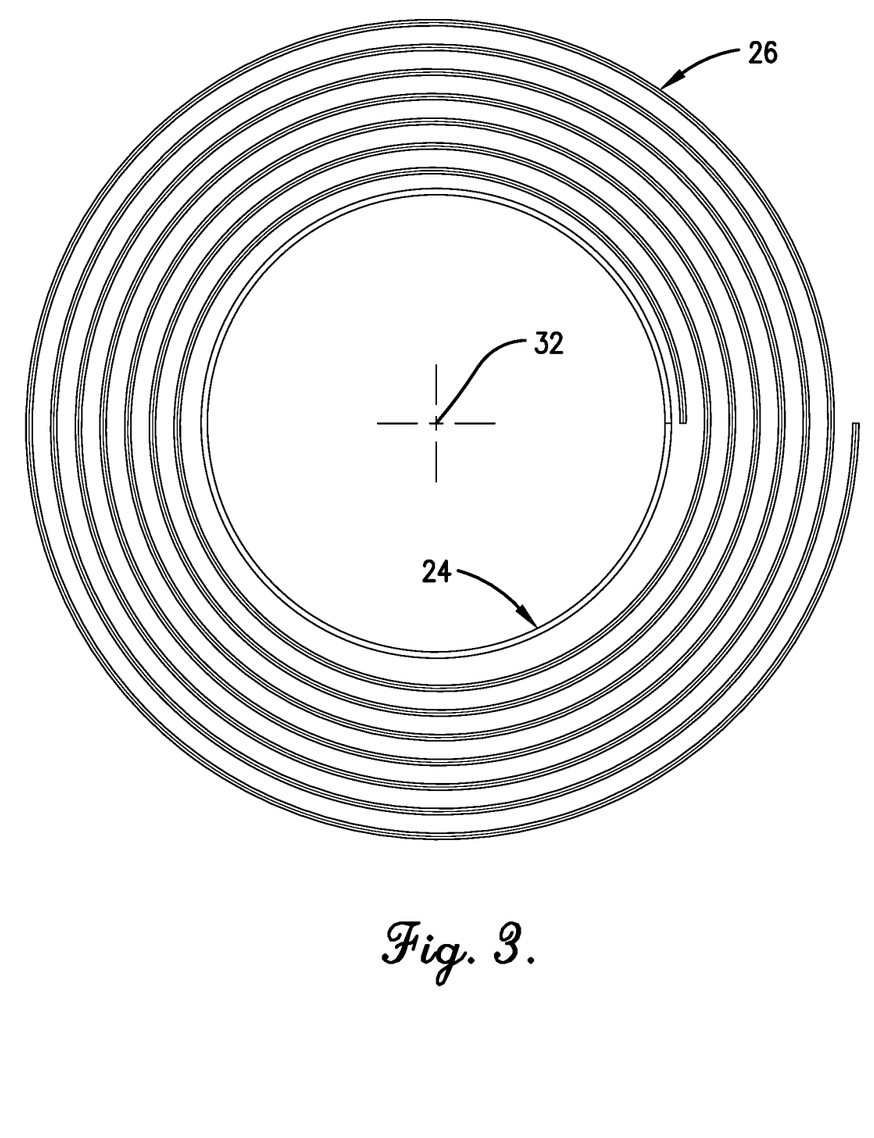
FIG. 3 is a bottom view of the antennas of FIG. 2 viewed along lines 3-3.

The first arm 24 and the second arm 26 may be physically electrically isolated, or not physically connected by conductive material. For example, they may be both supported on or secured to a non-conductive material. In some embodiments, the first arm 24 and the second arm 26 may extend about the axis 32 in the same direction. In other words, if viewing the transmitting antenna 18 along lines 3-3, as depicted in FIG. 3, the first and second arms 24, 26 are wound about the axis 32 in the same direction, as indicated by the arrow. However, in some embodiments, the first and second arms 24, 26 are wound about the axis 32 in opposite directions. While the first and second arms 24, 26 are depicted as both being wound about axis 32, they may be offset without departing from the scope of the present invention. In some embodiments, the first arm 24 has about 2 to about 5.5 times more turns than the second arm 26. In some embodiments, the first arm 24 has about 21 to about 31 turns, and the second arm 26 has about 5 to about 9 turns. The first and second arms 24, 26 may both be formed of conductive materials, such as metal. In preferred embodiments, the first and second arms 24, 26 comprise copper.

Turning back to FIG. 2, the receiving antenna 20 receives the electromagnetic waves from the transmitting antenna 18. The receiving antenna 20 may also include a first arm 44 and a second arm 46. However, the receiving antenna 20 may only include a first arm 44 without departing from the scope of the present invention. The first arm 44 of the receiving antenna 20 includes a proximal end 48 and a distal end 50 extending helically about the axis 32 at a radius that is about the same length as the radius 34 of the first arm 24 of the transmitting antenna 18. The first arm 44 may also form a multiturn helix, similar to the first arm 24 of the transmitting antenna 18. The electromagnetic waves from the transmitting antenna 18 induce a signal in the first arm 44 of the receiving antenna 20, and the first arm 44 may be electrically connected to the rectifying or converting circuit 22 and/or the load or energy storage device 14.

The second arm 46 of the receiving antenna 20 has a proximal end 52 and a distal end 54 that extends helically about the axis 32 toward the distal end 50 of the first arm 44 of the receiving antenna 20. The radius between the second arm 46 and the axis 32 increases in a distal direction away from the proximal end 52 of the second arm 46 of the receiving antenna 20. The size and proportions of the second arm 46 may be generally the same as the second arm 26 of the transmitting antenna 18. The second arm 46 of the receiving antenna 20 may also form a conical shape. In some embodiments, the first arm 44 has about 2 to about 5.5 times more turns than the second arm 46. In some embodiments, the first arm 44 has about 21 to about 31 turns, and the second arm 46 has about 5 to about 9 turns. The first and second arms 44, 46 of the receiving antenna 20 may also be formed of conductive materials, such as metal. In preferred embodiments, the first and second arms 44, 46 comprise copper.

The transmitting antenna 18 and the receiving antenna 20 may be spaced apart by a distance. In some embodiments, the distance is about equal to a longitudinal length of the transmitting antenna 18. The antennas 18, 20 face one another so that the proximal ends 28, 36 of the transmitting antenna 18 are proximal to the proximal ends 48, 52 of the receiving antenna 20. While the arms 24, 26, 44, 46 of the antennas 18, 20 are depicted as all being coaxial and wound about the same axis 32, they may be offset without departing from the scope of the present invention.

As mentioned above, the inventors have discovered that the directions in which the arms 24, 26, 44, 46 of the antennas 18, 20 extend about the axis 32 affects the efficiency of the transfer of power between the antennas 18, 20. Particularly, when viewing the antennas 18, 20 along lines 3-3, the inventors have found that the direction of the first arms 24, 44 should generally extend about the axis 32 in the same direction, and the second arms 26, 46 should generally extend about the axis 32 in the same direction.

For example, if the first arm 24 of the transmitting antenna 18 is wound about the axis 32 counter-clockwise as viewed from lines 3-3, then the first arm 44 of the receiving antenna 20 should generally also be wound about the axis 32 counter-clockwise as viewed from lines 3-3. Further, if the second arm 26 of the transmitting antenna 18 is wound about the axis 32 counter-clockwise as viewed from lines 3-3, then the second arm 46 of the receiving antenna 20 should generally also be wound about the axis 32 counter-clockwise as viewed from lines 3-3. However, the inventors have also found that in some embodiments, discussed further below, the antennas 18, 20 achieve relatively efficient power transfer when the first and second arms 24, 26 of the transmitting antenna 18 are wound in the same direction, and the first and second arms 44, 46 of the receiving antenna 20 are wound in the same direction but opposite to the direction of the first and second arms 24, 26 of the transmitting antenna 18.

Turning back to FIG. 1, the rectifier or converter circuit 22 may be configured to rectify, smooth, and/or convert the signal induced in the receiver antenna 20. The rectifier or converter circuit 22 may then pass the rectified, smoothed, and/or converted signal to the load or energy storage device 14.

EXAMPLE

The following example sets forth antennas constructed in accordance with an embodiment of the invention. It is to be understood, however, that this example is provided by way of illustration and nothing therein should be taken as a limitation upon the overall scope of the invention. For the transmitting antenna, the first arm had 26 turns and a radius of about 4.5 cm, and the second arm had 7 turns, a radius between the proximal end and the second axis of about 5 cm, an axial pitch of about 0.2 cm, and a radial pitch of about 0.5 cm. For the receiving antenna, the first arm had 26 turns and a radius of about 4.5 cm, and the second arm had 7 turns, a radius between its proximal end and its axis of about 5 cm, an axial pitch of about 0.2 cm, and a radial pitch of about 0.5 cm. The longitudinal lengths of the transmitting antenna and the receiving antenna is about 16 cm.

The results of the efficiency of the exemplary embodiment at different distances, signal frequencies, and winding configurations are shown in Table 1 below. Inventors have found that the second arms of the antennas are able to effectively contain the field of the electromagnetic waves involved in the transfer of power.

TABLE 1

MEASURED WPT EFFICIENCIES FOR CHIRAL COMBINATIONS

| Order of chirality: Transmitter-Parasitic-Parasitic-Receiver (Note R for right and L for L chirality) | Distance in cm | First S21 dB | WPT Transfer Efficiency | Frequency of Max Transfer MHz |
|---|---|---|---|---|
| RRRL or LLLR | 20 | −18.3 | 1.48% | 16.58 |
|  | 15 | −15.9 | 2.57% | 16.57 |
|  | 10 | −13 | 5% | 16.44 |
|  | 5 | −9.24 | 11% | 16.36 |
| LRLR or RLRL | 20 | −13 | 5% | 14.41 |
|  | 15 | −11 | 7.9% | 14.41 |
|  | 10 | −8.3 | 14.8% | 14.32 |
|  | 5 | −5.3 | 29.5% | 14.15 |
| RLRL | 30 | −10 | 10% | 14.46 |
|  | 20 | −7.9 | 16.21% | 14.99 |
|  | 15 | −10 | 10% | 14.736 |
|  | 10 | −8.7 | 13.31% | 14.76 |
|  | 5 | −8.6 | 13.8% | 14.68 |
| RLLL | 20 | −18 | 1.58% | 16.35 |
|  | 15 | −15 | 3.16% | 16.31 |
|  | 10 | −12 | 6.3% | 16.31 |
|  | 5 | −9 | 12.6% | 16.1 |
| RRLL or LLRR | 20 | −4.5 | 35.48% | 16.375 |
|  | 15 | −2.4 | 57.5% | 16.375 |
|  | 10 | −1.4 | 72.44% | 16.09 |
|  | 5 | −1.45 | 71.61% | 16.66 |
| LRRR | 20 | −13.43 | 4.54% | 14.04 |
|  | 15 | −10.4 | 9.12% | 14.01 |
|  | 10 | −6.7 | 21.37% | 13.88 |
|  | 5 | −3.62 | 41.5% | 13.44 |
| LLLL or RRRR | 20 | −1.4 | 72.44% | 16.26 |
|  | 15 | −0.99 | 79.61% | 16.27 |
|  | 10 | −1.15 | 76.73% | 16.58 |
|  | 5 | −0.96 | 80.16% | 15.165 |
| LLLR or RRRL | 20 | −13.5 | 4.467% | 14.51 |
|  | 15 | −11.67 | 6.8% | 14.41 |
|  | 10 | −7.5 | 17.78% | 14.28 |
|  | 5 | −3.58 | 43.85% | 14.1 |
| LRRL or RLLR | 20 | −1.1 | 77.62% | 13.929 |
|  | 15 | −1.5 | 70.8% | 13.708 |
|  | 10 | −1.21 | 75.7% | 13.64 |
|  | 5 | −1.1 | 77.65% | 11.91 |

Method Embodiment

Figure 4:
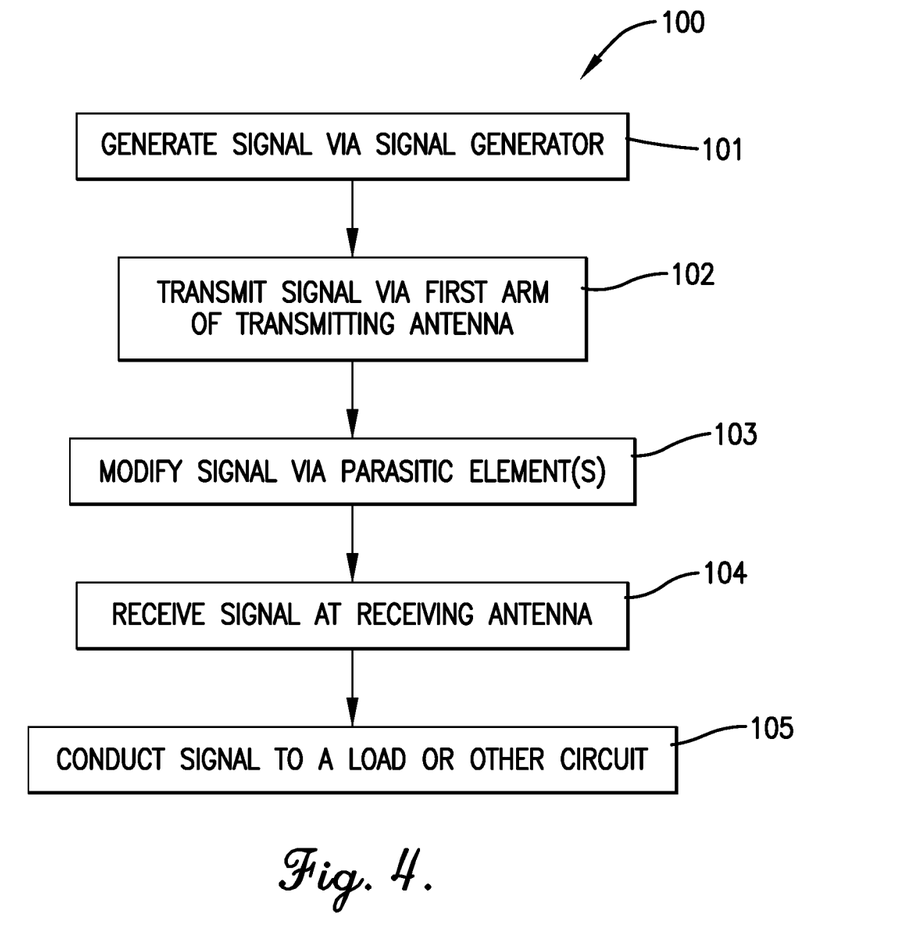
FIG. 4 is a flowchart depicting exemplary steps of a method according to an embodiment of the present invention.

The flow chart of FIG. 4 depicts the steps of an exemplary method 100 of wireless power transfer. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional. The method 100 is described below, for ease of reference, as being executed by exemplary devices and components introduced with the embodiments illustrated in FIGS. 1-3.

Referring to step 101, a signal is generated via a signal generator. The signal may have any power or frequency without departing from the scope of the present invention. In some embodiments, the frequency is between 10 MHz and 20 MHz. In some embodiments the frequency is between 11 MHz and 14 MHz. In some preferred embodiments, the frequency is between 15 MHz and 17 MHz.

Referring to step 102, electromagnetic waves are transmitted via a first arm of a transmitting antenna. The electromagnetic waves may be generated via the signal from the signal generator. The first arm may comprise a proximal end and a distal end extending helically about a central axis.

Referring to step 103, the electromagnetic waves are modified via a second arm of the transmitting antenna. The second arm has a proximal end and a distal end extending helically about a second central axis toward the distal end of the first arm. A radius between the second arm and the second central axis increases in a distal direction away from the proximal end. The second arm acts as a parasitic element to modify and contain the electromagnetic field emanating from the first arm.

Referring to step 104, the electromagnetic waves are received at a receiving antenna. The receiving antenna may include a first arm having a proximal end and a distal end extending helically about the central axis, and a second arm having a proximal end and a distal end extending helically about the axis toward the distal end of the first arm of the receiver antenna. A radius between the second arm of the receiver antenna and the central axis increases in a distal direction away from the proximal end of the second arm of the receiver antenna. The second arm of the receiving antenna may also act as a parasitic element that helps modify and contain the electromagnetic field emanating from the first arm of the transmitting antenna. The received electromagnetic waves may induce a current or signal in the first arm of the receiving antenna.

Referring to step 105, the signal induced in the first arm of the receiving antenna is conducted to a load. This step may include rectifying and smoothing the signal and conducting the signal to a DC load and/or converting the generally DC to signal to an AC signal and conducting it to an AC load, such as a motor or the like. This step may include conditioning the signal and providing the signal to an AC load.

The method 100 may include additional, less, or alternate steps and/or device(s), including those discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An antenna for transmitting power in a wireless power transfer system, the antenna comprising: a first arm having a proximal end and a distal end extending helically about a first central axis; and a second arm having a proximal end and a distal end extending helically about a second central axis toward the distal end of the first arm, wherein a radius between the second arm and the second central axis increases in a distal direction away from the proximal end, wherein the first arm defines a first opening having a first radius, and the proximal end of the second arm defines a second opening having a second radius that is longer than the first radius.

2. The antenna of claim 1, wherein the proximal end of the second arm at least partially defines an opening, and the proximal end of the first arm extends into the opening.

3. The antenna of claim 1, wherein the first arm has 2 to 5.5 times more turns than the second arm.

4. The antenna of claim 1, wherein the first arm has 21 to 31 turns, and the second arm has 5 to 9 turns.

5. The antenna of claim 1, wherein—
the first arm has 26 turns and a radius of about 4.5 cm, and
the second arm has 7 turns, a radius between the proximal end and the second axis of about 5 cm, an axial pitch of about 0.2 cm, and a radial pitch of about 0.5 cm.

6. An antenna structure for transferring power in a wireless power transfer system, the antenna structure comprising: a transmitting antenna for emitting electromagnetic waves and comprising-a first arm having a proximal end and a distal end extending helically about a first central axis; and a second arm having a proximal end and a distal end extending helically about a second central axis toward the distal end of the first arm, wherein a radius between the second arm and the second central axis increases in a distal direction away from the proximal end; and a receiving antenna for receiving the electromagnetic waves from the transmitting antenna and comprising a first arm having a proximal end and a distal end extending helically about a third central axis, wherein the receiving antenna comprises a second arm having a proximal end and a distal end extending helically about a fourth central axis toward the distal end of the first arm, wherein a radius between the second arm and the fourth central axis increases in a distal direction away from the proximal end.

7. The antenna structure of claim 6, wherein the first central axis, the second central axis, the third central axis, and the fourth central axis are coaxial.

8. The antenna structure of claim 7, wherein the proximal end of the first arm of the transmitting antenna is proximal to the proximal end of the first arm of the receiving antenna.

9. The antenna structure of claim 8, wherein the transmitting antenna and the receiving antenna are separated by a distance.

10. The antenna structure of claim 9, wherein the distance is about equal to a longitudinal length of the transmitting antenna.

11. The antenna structure of claim 10, wherein the transmitting antenna is operable to transmit an electromagnetic signal having a wavelength about twice as long as the longitudinal length of the transmitting antenna.

12. The antenna structure of claim 6, wherein the proximal ends of the second arms of the transmitting and receiving antennas at least partially define openings, and the proximal ends of the first arms of the transmitting and receiving antennas extend into their respective openings.

13. The antenna structure of claim 6, wherein the first arms of the transmitting and receiving antennas define first openings having first radiuses, and the proximal ends of the second arms of the transmitting and receiving antennas define second openings having second radiuses that are longer than the first radiuses.

14. The antenna structure of claim 6, wherein the first arms of the transmitting and receiving antennas have 2 to 5.5 times more turns than the second arms of the transmitting and receiving antennas.

15. The antenna structure of claim 6, wherein the first arms of the transmitting and receiving antennas each have 21 to 31 turns, and the second arms of the transmitting and receiving antennas each have 5 to 9 turns.

16. The antenna structure of claim 6, wherein—
the first arms of the transmitting and receiving antennas each have 26 turns and radiuses of about 4.5 cm, and
the second arms of the transmitting and receiving antennas each have 7 turns, radiuses between their proximal ends and their respective second axes of about 5 cm, axial pitches of about 0.2 cm, and radial pitches of about 0.5 cm.

17. A method of wireless power transfer comprising: emitting electromagnetic waves via a transmitting antenna having a first arm with a proximal end and a distal end extending helically about a first central axis; modifying the electromagnetic waves via a second arm of the transmitting antenna, the second arm having a proximal end and a distal end extending helically about a second central axis toward the distal end of the first arm, wherein a radius between the second arm and the second central axis increases in a distal direction away from the proximal end; receiving the electromagnetic waves from the transmitting antenna via a receiver antenna comprising a first arm having a proximal end and a distal end extending helically about a third central axis; and modifying the electromagnetic waves from the transmitting antenna via a second arm of the receiver antenna, the second arm of the receiver antenna having a proximal end and a distal end extending helically about a fourth central axis toward the distal end of the first arm of the receiver antenna, wherein a radius between the second arm of the receiver antenna and the fourth central axis increases in a distal direction away from the proximal end of the second arm of the receiver antenna.

18. An antenna for transmitting power in a wireless power transfer system, the antenna comprising: a first arm having a proximal end and a distal end extending helically about a first central axis; and a second arm having a proximal end and a distal end extending helically about a second central axis toward the distal end of the first arm, wherein a radius between the second arm and the second central axis increases in a distal direction away from the proximal end, wherein the proximal end of the second arm at least partially defines an opening, and the proximal end of the first arm extends into the opening.

\* \* \* \* \*